US006749384B1

(12) United States Patent
Ellis

(10) Patent No.: US 6,749,384 B1
(45) Date of Patent: Jun. 15, 2004

(54) DRIVE RIVET

(75) Inventor: Thomas J. Ellis, Wilmington, DE (US)

(73) Assignee: Southco, Inc., Concordville, PA (US)

( * ) Notice: Subject to any disclaimer, the term of this patent is extended or adjusted under 35 U.S.C. 154(b) by 1,826 days.

(21) Appl. No.: 08/018,865

(22) Filed: Feb. 17, 1993

(51) Int. Cl.[7] .................. F16B 13/06; F16B 19/08
(52) U.S. Cl. ................. 411/45; 411/60.1; 411/502
(58) Field of Search .................. 411/40, 41, 45–48, 411/60, 61, 57, 502, 503, 57.1, 60.1

(56) References Cited

U.S. PATENT DOCUMENTS

| 2,424,602 A | * | 7/1947 | DeSwart ............... 411/41 |
| 2,668,468 A | | 2/1954 | Flogaus |
| 2,877,682 A | | 3/1959 | Barry |
| 3,105,407 A | * | 10/1963 | Rapata ................ 411/41 |
| 3,176,329 A | | 4/1965 | Frame |
| 3,178,991 A | | 4/1965 | Bisbing |
| 3,198,058 A | | 8/1965 | Barry |
| 3,203,304 A | * | 8/1965 | Rapata ................ 411/41 |
| 3,385,158 A | * | 5/1968 | Morin ................. 411/45 |
| 3,411,397 A | * | 11/1968 | Birmingham ........... 411/41 |
| 4,375,342 A | * | 3/1983 | Wollar et al. .......... 411/41 |
| 4,391,559 A | * | 7/1983 | Mizusawa ........... 411/41 X |
| D204,415 S | | 4/1986 | Barry |
| 5,030,051 A | * | 7/1991 | Kaneko et al. ....... 411/41 X |

OTHER PUBLICATIONS

Southco Fasteners Handbook 40 (Southco, Inc. Pennsylvania 1990) p. A1–12.

* cited by examiner

Primary Examiner—Neill Wilson
(74) Attorney, Agent, or Firm—Paul & Paul

(57) ABSTRACT

A drive rivet fastens a plurality of panel members together as a unit. The drive rivet is installed within preformed holes which are drilled or punched through each of the panel members. The drive rivet includes a head portion which abuts the outer surface of the first panel member when installed. A shank portion extends from the head portion and includes a plurality of expansible prongs on its distal end which protrude out from the opposite end of the panel members. The shank portion includes at least a first area of substantially constant diameter and a second area of decreased diameter less than that of the first area which is not in contact with the panel members when the drive rivet is received therein. A generally elongated bore is formed within the drive rivet which is adapted for receiving an expander pin. The expander pin is driven through the elongated bore which urges the expansible prongs outward, which causes the shanks second area of decreased diameter into engagement with the panel members, in order for securing the panel members in the fastened position.

5 Claims, 1 Drawing Sheet

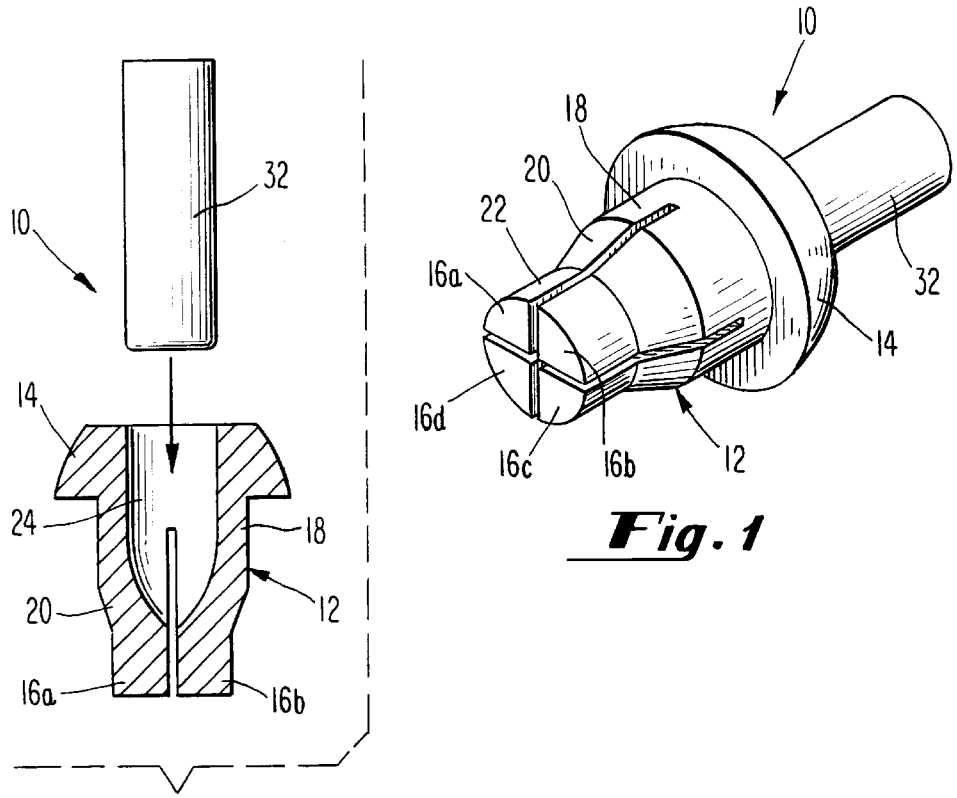
Fig. 1
Fig. 2
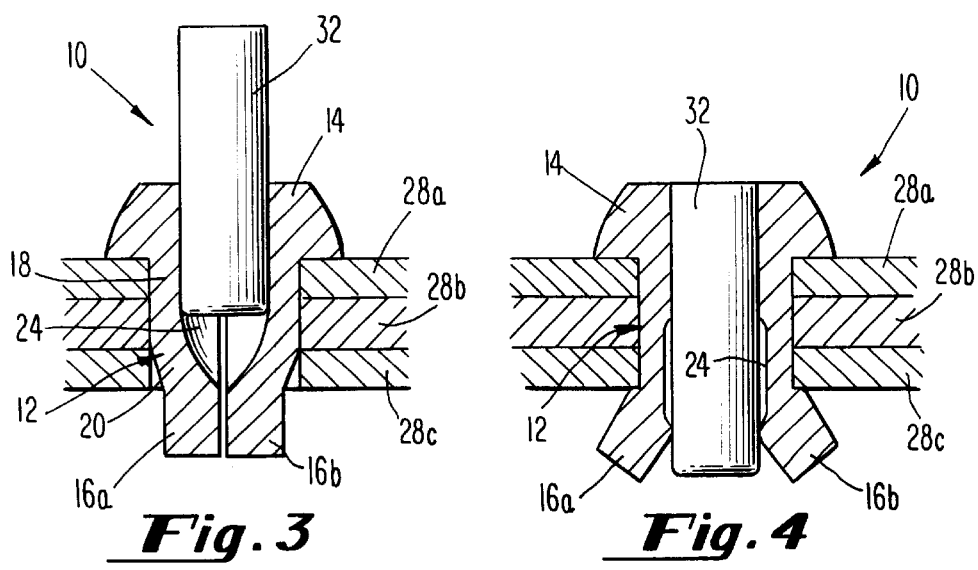
Fig. 3
Fig. 4

DRIVE RIVET

BACKGROUND OF THE INVENTION

1. Field of the Invention

The present invention relates generally to fastening devices adapted for securing structural members together, such as metal plates, panels of wood, plastic sheets and the like; and more particularly to drive rivets which are adapted for retaining such structural members together by driving a pin or the like through a shaped opening formed in the rivet in order for expanding a number of pronged members thereon which fasten the members together.

2. Brief Description of the Prior Art

Drive rivets have been known in the art for many years for use in fastening a plurality of various separate structural members, panels or the like together as a unit. Generally, such rivets are first installed within preformed holes which are drilled or punched through each respective structural member. A preformed head is usually included which abuts against the first member when installed and on the distal end are a number of pronged members which protrude outwardly through the hole that is formed in the last member. A drive pin or the like is then driven through an opening formed within the center of the head of the rivet which works to expand the prongs outwardly and against the underside of the last member in order for securing the members together against the underside of the preformed head.

Generally, the force which is required for driving or installing a drive pin within a drive rivet is dependent upon the total thickness of the members which are to be fastened. For example, with increased thicknesses, the force which is required for installing the pin can be very high, and, as such, it is oftentimes difficult or impossible, in such applications, to drive the pin within the rivet and thereby expand the prongs. Specifically, there is a particular range of thicknesses with which a rivet can operate satisfactorily; with the maximum thickness being of value which will allow pin installation into the rivet with a level of force reasonable to the user.

As such, there is a need for an improved drive rivet having a greater range of operation; in particular one which is capable of being used with increased thicknesses, and which will not require a significant increase in the level of force necessary for installation of the drive pin.

SUMMARY OF THE INVENTION

The drive rivet of the present invention is adapted for retaining in a fastened position at least a first and a second panel member of varying aggregate thicknesses. The first and second panel members each include an inner and an outer surface, and also an aperture therethrough for receiving the drive rivet for installation. The drive rivet includes a head portion formed on one end which abuts the outer surface of the first panel member when installed. A generally elongated shank portion is also included which extends inwardly from the head portion and through the apertures of the first and second panel members. The shank portion is included with an outer shank surface which includes at least a first and a second area. The first area of the outer shank surface is of a substantially constant diameter. The second area of the outer shank surface is of a diameter less than that of the first area and is not in engagement with the panel members when installed. The drive rivet also includes at least a first generally elongated bore extending from the head portion and into the shank. In addition, a plurality of expansible prongs are formed on the distal end of the shank which extend at least through the second area in the shank's outer surface. An expander pin is included which is driven into the bore of the drive rivet in order to expand the prongs outwardly for retaining the first and second panels in the fastened position. During the time when the expander pin is being driven into the bore, the second area of the shank's outer surface moves to engage at least the second panel member as the prongs are being expanded outwardly.

Advantageously, the present invention provides an improved drive rivet which is capable of fastening a plurality of panel members having an increased total thickness.

Furthermore, it is another advantage of the present invention to provide a drive rivet capable of fastening a plurality of panel members having an increased total thickness without also requiring a significant increase in the level of force necessary for installation of the rivet drive pin.

These and other objects and advantages of this invention will become more apparent when taken into consideration with the following description and the attached drawings.

BRIEF DESCRIPTION OF THE DRAWINGS

FIG. 1 is a perspective view of a first embodiment of a drive rivet according to the present invention.

FIG. 2 is a sectional front elevational view of the drive rivet of FIG. 1, showing installation of the drive pin.

FIG. 3 is a sectional front elevational view of the drive rivet of FIG. 2, shown installed within a plurality of panel members.

FIG. 4 is a sectional front elevational view of the drive rivet of FIG. 3, shown in a fastened position.

DETAILED DESCRIPTION OF THE PREFERRED EMBODIMENTS

Referring now to the drawings in detail wherein like reference numerals indicate like elements throughout the several views, there is shown in FIG. 1 a first preferred embodiment of a drive rivet 10 according to the present invention. The drive rivet 10, as illustrated, comprises a generally elongated shank 12 having, associated therewith, a mushroom-shaped head 14 at one end and a plurality of expansible prongs, preferably comprising prongs 16a–16d, formed at its opposite end. The four expansible prongs 16a–16d, as shown, are cut, or otherwise formed, within the generally elongated shank 12, however any appropriate number can be provided for the purpose described below.

The elongated shank 12, as best seen in FIG. 2, includes, as portions along its outer surface, a substantially cylindrical first area 18, a tapered second area 20 and a substantially cylindrical third area 22. The tapered second area 20 is formed having its diameter less than that of the substantially cylindrical first area 18. The substantially cylindrical third area 22, as shown, extends from the tapered second area 20, and has a diameter smaller than that of the first area 18, due to the inward taper of the second area 20. Preferably, the expansible prongs 16a–16d are formed extending radially inward from the distal end of the shank 12 and terminate within the substantially cylindrical first area 18. However, other lengths can also be provided for this same purpose.

The mushroom-shaped head 14, as best seen in FIG. 2, is provided having a generally elongated bore 24 therein, which extends a predetermined distance into the generally elongated shank 12, preferably within its tapered second area 20. The generally elongated bore 24, as shown, preferably is included having a substantially radiused cavity at its distal end, positioned within the shank portion 12.

In operation, as shown in FIGS. 2 and 3, the drive rivet 10 is installed within a plurality of panel members, for example, panels 28a–28c as shown in FIG. 3. The panels 28a–28c are each provided with preformed apertures therein in order for receiving the drive rivet 10. When received, the drive rivet 10 has its mushroom-shaped head portion 14 abutting against the outer surface of the first panel member 28a, the substantially cylindrical first area 18 of the shank portion 12 within the apertures of the first and second panel members 28a and 28b, respectively, however, not necessarily in contact therewith, and the expansible prongs 16a–16d extending outward from the panels 28a–28c. The tapered second area 20, as shown in FIG. 3, is not in contact with any of the panel members 28a–28c in this position.

After the drive rivet 10 has been installed within the panel members 28a–28c, an expander pin 32, as best seen in FIGS. 2–4, is driven through the elongated bore 24, by means of a hammer or other suitable power tool, applied to its substantially flat upper end. As the expander pin 32 is driven through the drive rivet 10, the expansible prongs 16a–16d are gradually spread apart radially outward, with a point of bending taking place via the inner corner of the third panel 28c. As a result, it will be seen that the panel members 28a–28c are forced upwardly against the underside of the head portion 14, thereby fastening the panel members 28a–28c together as a unit. In this fastened position, as shown in FIG. 4, the tapered second area 20 of the shank portion 12 is in engagement with the aperture of the third panel member 28c. This tapered second area 20 operates to provide for an increased expansion of the expansible prongs 16a–16d. It is this increased expansion of the expansible prongs 16a–16d, as resulting from the tapered second area 20 of the shank portion 12, in combination with the substantially radiused cavity of the elongated bore 24, which provides for the fastening of the panel members 28a–28c.

It will be recognized by those skilled in the art that changes may be made to the above-described embodiments of the invention without departing from the broad inventive concepts thereof. For example, multiple tapered second areas, each having different diameters and each extending along the shank portion, and/or multiple generally elongated bores, also each having varying diameters and each extending within the drive rivet, can be provided for this same purpose. Furthermore, one or more stepped sections can be provided extending along the outer surface of the shank portion along any given section, rather than the tapered second area as described above. In addition, the expansible pin 32, which is shown generally flat on its distal end, can be comprised having any suitable configuration. Further, the generally elongated bore, which is shown formed having the substantially radiused cavity at its terminating end, can be formed comprising any appropriate shape or configuration. It is understood, therefore, that this invention is not limited to the particular embodiments disclosed, but it is intended to cover all modifications which are within the scope and spirit of the invention as defined by the appended claims.

What is claimed is:

1. A drive rivet adapted for retaining in a fastened position at least a first and a second panel member of varying aggregate thicknesses, the first and second panel members each having an inner and an outer surface and a rivet-receiving aperture formed therethrough for receiving the drive rivet, the drive rivet comprising:

a head portion formed on one end thereof adapted for abutting the outer surface of the first panel member as the drive rivet is received within the rivet-receiving apertures of the first and second panel members;

a generally elongated shank portion associated with and extending inwardly from the head portion adapted for being received within the rivet-receiving apertures of the first and second panel members, the shank portion including an outer shank surface having at least a first and second area thereon, the first area being of a substantially constant diameter and the second area being of a diameter less than that of the first area and not in engagement with the first or second panel members when received within the rivet-receiving apertures thereof, the outer shank surface further including a third area of substantially constant diameter proximate the second area of the outer shank surface, the diameter of the third area being generally less than the diameter of the first area of the outer shank surface;

at least a first generally elongated bore extending a predetermined distance from the head portion and terminating within the shank portion of the drive rivet;

a plurality of expansible prongs formed at the distal end of the shank and extending at least through the second area of shank's outer surface; and an expander pin for insertion into the bore of the drive rivet adapted for expanding the prongs outwardly for retaining the first and second panels in the fastened position, whereby when the expander pin is inserted into the bore, the second area of the shank's outer surface will be moved to engage at least the second panel member within the rivet-receiving aperture thereof as the prongs are expanded outwardly for retaining the first and second panel members.

2. A drive rivet according to claim 1, wherein the generally elongated bore includes a substantially radiused cavity at its terminating end within the shank portion of the drive rivet.

3. A drive rivet according to claim 2, wherein the substantially radiused cavity of the generally elongated bore is provided within the shank portion of the drive rivet positioned substantially within the second area of the outer shank surface.

4. A drive rivet according to claim 1, wherein the second area of the outer shank surface is tapered inwardly along the elongated shank portion away from the first and second panel members when received within the rivet-receiving apertures thereof.

5. A drive rivet adapted for retaining in a fastened position at least a first and a second panel member of varying aggregate thicknesses, the first and second panel members each having an inner and an outer surface and a rivet-receiving aperture formed therethrough for receiving the drive rivet, the drive rivet comprising:

a head portion formed on one end thereof adapted for abutting the outer surface of the first panel member as the drive rivet is received within the rivet-receiving apertures of the first and second panel members;

a generally elongated shank portion associated with and extending inwardly from the head portion adapted for being received within the rivet-receiving apertures of the first and second panel members, the shank portion including an outer shank surface having at least a first, a second and a third area thereon, the first area being of a substantially constant diameter, the second area being of a diameter less than that of the first area, tapered inwardly along the elongated shank portion, and not in engagement with the first or second panel members when received within the rivet-receiving apertures thereof, and the third area being of substantially constant diameter proximate the second area of the outer shank surface, the diameter of the third area being generally less than the diameter of the first area of the outer shank surface;

at least a first generally elongated bore extending a predetermined distance from the head portion and terminating within the shank portion of the drive rivet, the generally elongated bore including a substantially radiused cavity at its terminating end, the substantially radiused cavity being positioned substantially within the second area of the outer shank surface;

a plurality of expansible prongs formed at the distal end of the shank and extending at least through the second area of the shank's outer surface; and an expander pin for insertion into the bore of the drive rivet adapted for expanding the prongs outwardly for retaining the first and second panels in the fastened position, whereby when the expander pin is inserted into the bore, the second area of the shank's outer surface will be moved to engage at least the second panel member within the rivet-receiving aperture thereof as the prongs are expanded outwardly for retaining the first and second panel members.

* * * * *

UNITED STATES PATENT AND TRADEMARK OFFICE
CERTIFICATE OF CORRECTION

PATENT NO. : 6,749,384 B1 Page 1 of 1
DATED : June 15, 2004
INVENTOR(S) : Ellis

It is certified that error appears in the above-identified patent and that said Letters Patent is hereby corrected as shown below:

<u>Title page,</u>
Item [75], Inventors, add -- James H. Vickers --.

Signed and Sealed this

Fifteenth Day of November, 2005

JON W. DUDAS
*Director of the United States Patent and Trademark Office*